(12) United States Patent
Watabiki et al.

(10) Patent No.: US 7,707,648 B2
(45) Date of Patent: May 4, 2010

(54) HELMET WITH VISOR

(75) Inventors: Hiroaki Watabiki, Tokyo (JP); Hiroshi Ueno, Tokyo (JP); Heisaburo Hiratsuka, Tokyo (JP)

(73) Assignee: Midori Anzen Co., Ltd., Tokyo (JP)

( * ) Notice: Subject to any disclaimer, the term of this patent is extended or adjusted under 35 U.S.C. 154(b) by 705 days.

(21) Appl. No.: 10/593,115

(22) PCT Filed: Feb. 17, 2005

(86) PCT No.: PCT/JP2005/002414

§ 371 (c)(1),
(2), (4) Date: Dec. 5, 2006

(87) PCT Pub. No.: WO2005/090049

PCT Pub. Date: Sep. 29, 2005

(65) Prior Publication Data

US 2008/0250546 A1    Oct. 16, 2008

(30) Foreign Application Priority Data

Mar. 19, 2004  (JP)  ............................. 2004-080732
Apr. 21, 2004  (JP)  ............................. 2004-125905

(51) Int. Cl.
    *A61F 9/00*    (2006.01)
(52) U.S. Cl. ........................................................ 2/10
(58) Field of Classification Search ............. 2/410–418, 2/421, 10, 15, 6.1, 6.2, 6.3, 6.4, 6.5, 9
    See application file for complete search history.

(56) References Cited

U.S. PATENT DOCUMENTS

| | | | |
|---|---|---|---|
| 4,041,031 A | | 8/1977 | Heasman |
| 4,097,930 A | * | 7/1978 | Bay ................................ 2/10 |
| 4,100,619 A | * | 7/1978 | Piech et al. ...................... 2/10 |
| 4,192,017 A | * | 3/1980 | Fay ................................ 2/12 |
| 5,365,615 A | * | 11/1994 | Piszkin .......................... 2/422 |

FOREIGN PATENT DOCUMENTS

| | | |
|---|---|---|
| JP | 50-117552 | 9/1975 |
| JP | 07-109610 | 4/1995 |
| JP | 08-013230 | 1/1996 |
| JP | 10-512931 | 12/1998 |
| JP | 2984699 | 10/1999 |
| JP | 2001-146623 | 5/2001 |
| JP | 2002-503971 | 2/2002 |
| WO | WO 96/22710 | 8/1996 |
| WO | WO 97/02770 | 1/1997 |

* cited by examiner

*Primary Examiner*—Tejash Patel
(74) *Attorney, Agent, or Firm*—NDQ&M Watchstone LLP

(57) ABSTRACT

A helmet 1 with a visor formed by integrally joining the preliminarily injection-molded visor 5 to a cap body 3, wherein an opening end edge 9 formed on the cap body is joined to the outer side of a joining wall 17 formed on the visor 5, and the joining wall 17 is held by the opening end edge 9 and a tongue-shaped part 31 formed on the inside of the cap body 3. The joined faces of the visor 5 and the cap body 3 are joined to each other by fusing, an intruding engagement part intruded in a through hole 22 formed in the joining wall 17 is formed at the opening end edge of the cap body 3, and the joining portion of the visor and the cap body is formed in annular shapes.

8 Claims, 10 Drawing Sheets

FIG. 8
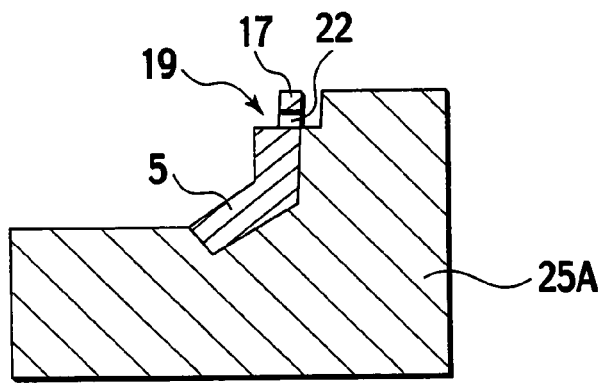
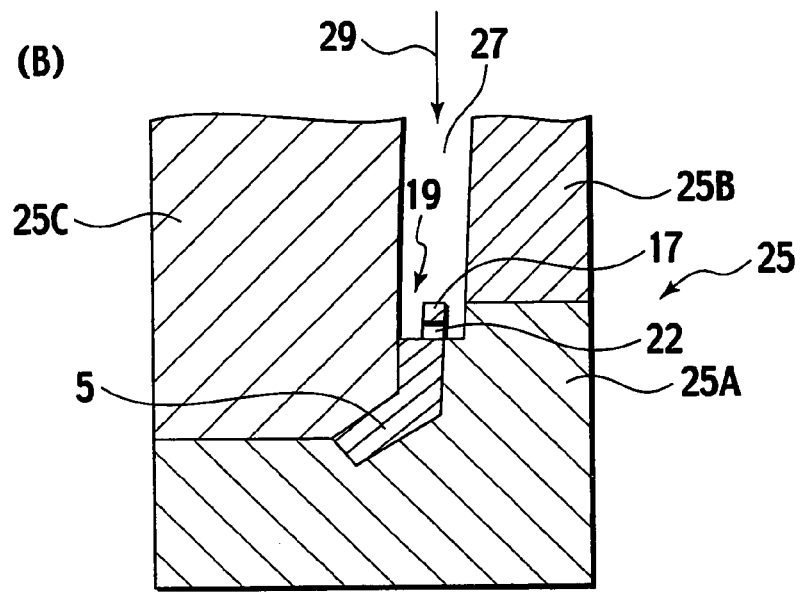
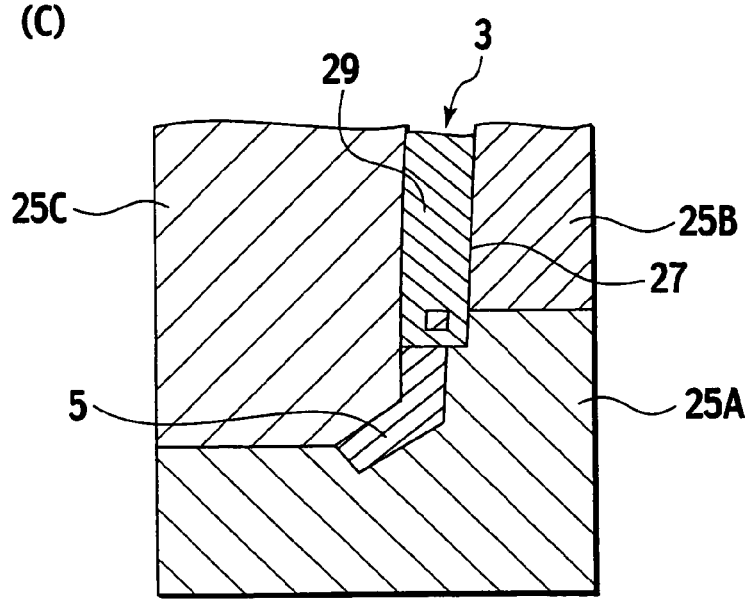

FIG. 11
(A)
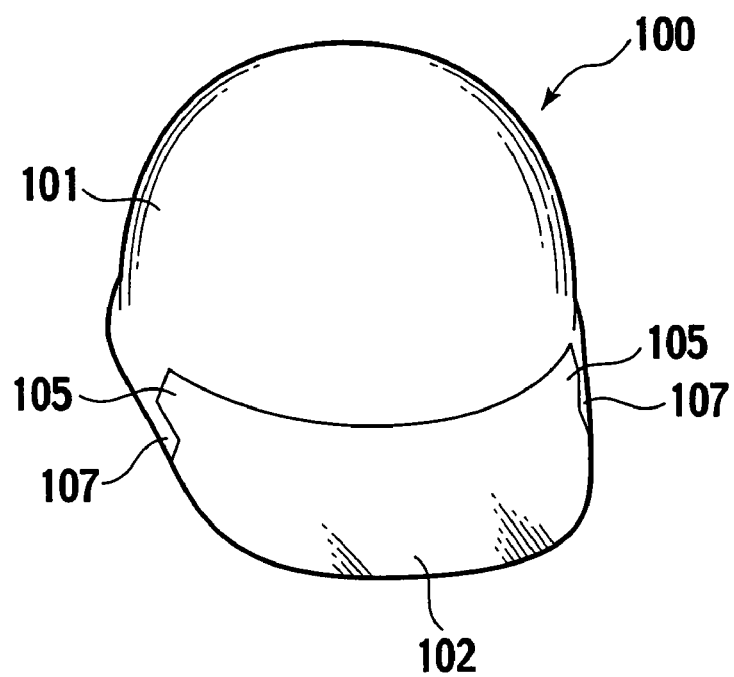
(B)
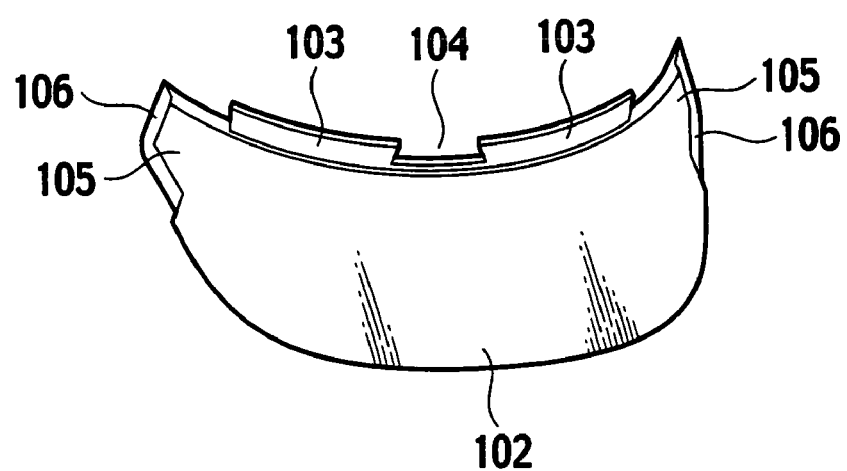

HELMET WITH VISOR

TECHNICAL FIELD

The present invention relates to a helmet with a visor. More specifically, the present invention relates to a helmet with a visor formed by integrally joining a preliminarily injection-molded thin resin molded article such as a visor to a cap body as a resin injection-molded article of the helmet when the cap body is injection-molded.

BACKGROUND ART

For a helmet with a visor used as a safety cap at, e.g., a building site, a civil engineering construction site, or the like, to widen an upper visual field, a helmet with a transparent visor has been proposed (e.g., Japanese Patent Publication No. 298469: see Patent Document 1).

In the helmet 100 with a visor disclosed in the Patent Document 1, as shown in FIG. 11, a transparent visor 102 is integrally joined to a front bottom of a cap body 101. To increase strength of a joining portion of the cap body 101 and the visor 102, a plurality of engagement pieces 103 are formed in the joining portion of the visor 102, and a locking part 104 which is a notched part is formed between the engagement pieces 103. Further, thin outer edges 106 are formed in outer peripheries of both ends 105 of the visor 102.

For joining of the cap body 101 and the visor 102, first, the visor 102 is inserted to be set in an injection mold for injection-molding the cap body 101. Then, when the cap body 101 is injection-molded, the cap body 101 and the visor 102 are integrally joined to each other.

As described above, when the cap body 101 and the visor 102 are integrated, in the cap body 101, projections 107 are formed to sandwich both ends 105 of the visor 102 from upper and lower sides.

For the safety cap (helmet), for example, polycarbonate is used as a material because of its high mechanical strength and high heat resistance. Conventionally, the visor and the cap body have integrally been injection-molded. When the visor is configured to be transparent and the cap body is configured to be opaque, as described in the Patent Document 1, after the visor is preliminarily injection-molded, this visor is inserted to be set in the injection mold for injection-molding the cap body. Then, when the cap body is injection-molded, the visor and the cap body are integrally joined to each other.

In the injection molding, a fused resin is injected for molding in a cavity of the injection mold. In this case, when flowing front ends of the resin divided in the cavity merge with each other again, a resin temperature is lowered to inhibit complete integration. Thus, a thin weld line (weld mark) is formed. As can be understood from this, a temperature of the flowing front end of the resin in the cavity is low.

The visor of the helmet as the safety cap is thin, and the injection-molded cap body is also thin. Accordingly, even when the front end of the flowing resin during the injection-molding of the cap body comes into contact with a joining surface of the ends of the visor set as an insert in the mold, it is difficult to integrally and firmly joint the visor and the cap body to each other by sufficiently fusing the joining surface of the visor.

According to the Patent Document 1, the locking part of the notched shape is formed between the engagement pieces of the visor, and a locking hole is formed in the engagement piece. When the cap body is injection-molded, by setting a fitted state where the engagement piece of the visor is buried in the resin of the cap body or the resin of the cap body is intruded into the locking part/locking hole, the visor and the cap body are mechanically integrated.

Thus, the conventional configuration has problems as follows. That is, when there is a tendency that an external force is applied to the visor to concentrate stress in the joining portion of the visor and the cap body thereby causing deformation, the visor is easily peeled off from the cap body. As it is necessary in configuration to form the locking part, the locking hole or the like in the mold for injection-molding the visor, the configuration of the mold becomes complex.

DISCLOSURE OF THE INVENTION

With the foregoing problems in mind, the present invention provides a helmet with a visor formed by integrally joining a preliminarily injection-molded visor to a cap body, the opening end edge and characterized in that an opening edge formed in the cap body is joined to a joining wall formed in the visor and an intruding engagement part which intrudes into a through-hole formed in the joining wall is formed at the opening edge of the cap body. And joining surfaces of the visor and the cap body are fused to be joined together.

According to the helmet with a visor formed by integrally joining the preliminarily injection-molded visor to the cap body, the opening end edge formed in the cap body is joined to an outer side of the joining wall formed in the visor, the joining wall is sandwiched by the opening end edge and the tongue-shaped part formed inside the cap body, and the joining surfaces of the visor and the cap body are fused to be joined together.

According to the helmet with a visor formed by integrally joining the preliminarily injection-molded visor to the cap body, the opening end edge formed in the cap body is joined to the outer side of the joining wall formed in the visor, the joining wall is sandwiched by the opening end edge and the tongue-shaped part formed inside the cap body, the joining surfaces of the visor and the cap body are fused to be joined together, and an intruding engagement part intruded into a through-hole formed in the joining wall is formed in the opening end edge of the cap body.

According to the helmet with a visor, the joining portion of the visor and the cap body is formed in annular shapes.

According to the helmet with a visor, the visor includes stress concentration prevention means for preventing stress concentration in the joining portion of the cap body and the visor.

According to the helmet with a visor, materials of the cap body and the visor are different from each other.

According to the helmet with a visor, a reinforcement portion is formed in an outer peripheral edge of at least a rear area of the visor.

According to the helmet with a visor, a section of the reinforcement portion is U-shaped.

According to the helmet with a visor, a joining portion of the visor and the cap body is built by forming the joining surface of the joining wall formed in the visor to be a rough surface, and fusing and joining this rough surface.

According to the present invention, as the joining portion of the visor and the cap body is annular in shape, it is possible to increase a joining area, and to strengthen the joining of the visor and the cap body. As the joining portion of the visor and the cap body is formed into the annular shapes to increase the joining area, the joining portion of the visor and the cap body can be formed into relatively simple shapes thereby facilitating the joining.

According to the present invention, as the microprojected part of the joining surface of the visor is fused to integrate the visor and the cap body, a configuration is similar to that when the visor is preliminarily injection-molded with the cap body, thereby increasing joining strength. Even when deformation occurs in the joining portion, the visor is never peeled off from the cap body.

BRIEF DESCRIPTION OF THE DRAWINGS

FIG. 8 are operation explanatory diagrams when the cap body and the visor are joined to each other.

FIG. 11 are explanatory diagrams showing a configuration of a conventional helmet and a configuration of a visor.

BEST MODES FOR CARRYING OUT THE INVENTION

Figure 1:
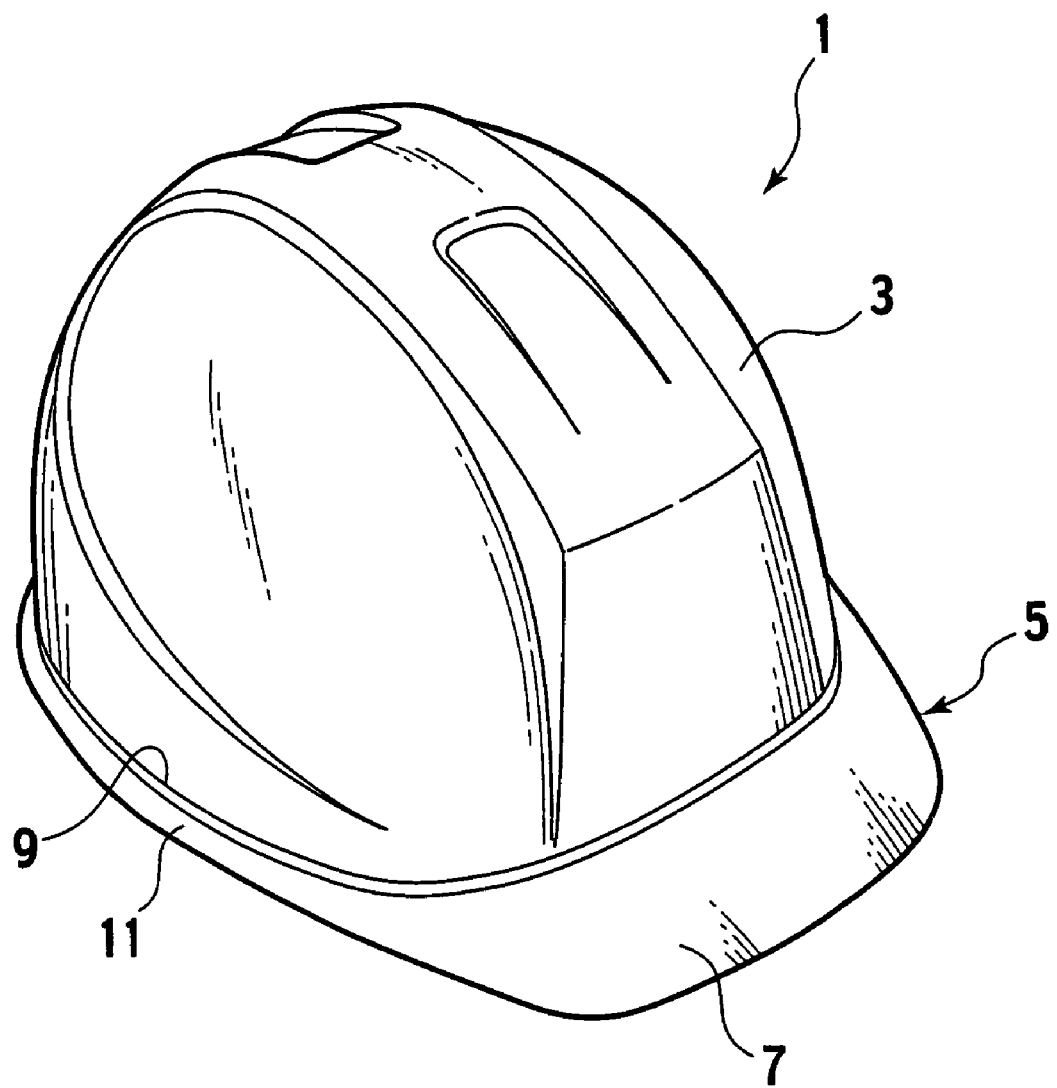
FIG. 1 is a schematic perspective explanatory diagram of a helmet with a visor according to an embodiment of the present invention.

As shown in FIG. 1, a helmet 1 of an embodiment of the present invention includes a cap body 3 to be put on a head, and this cap body 3 integrally includes a flange-shaped visor 5. For example, the cap body 3 and the visor 5 are made of proper resins such as polycarbonate, and formed to be thin with approximately equal thicknesses. The visor 5 is formed to be transparent. It should be noted that the visor 5 is not always transparent.

Figure 2:
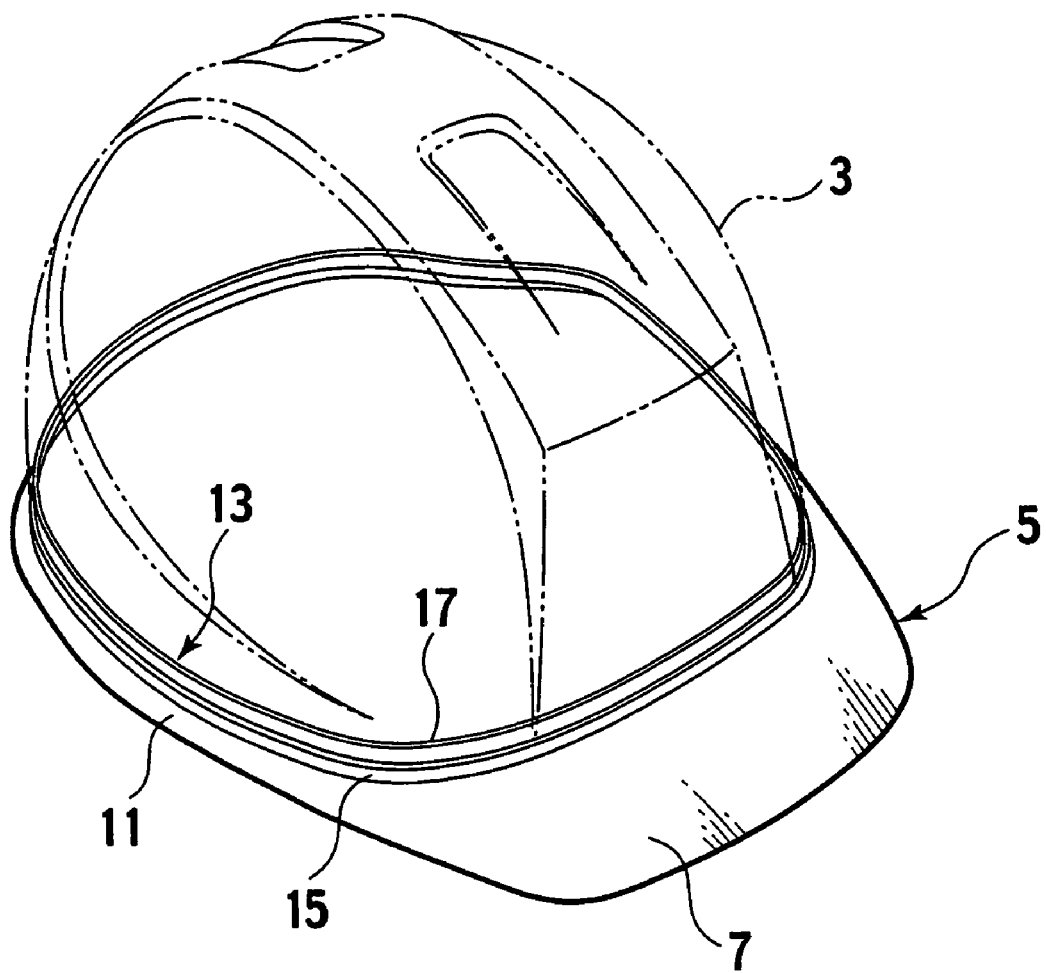
FIG. 2 is a schematic perspective explanatory diagram of the visor according to the embodiment of the present invention.

The visor 5 includes a wide flange part 7, and a belt-shaped annular portion 11 disposed in a rear part of the flange part 7 corresponding to a size of an opening end edge 9 of the cap body 3. The visor 5 includes an annular joining portion 13 (refer to FIGS. 2 and 3) integrally joined to an inner side of the opening end edge 9 of the cap body on the annular portion 11.

Figure 3:
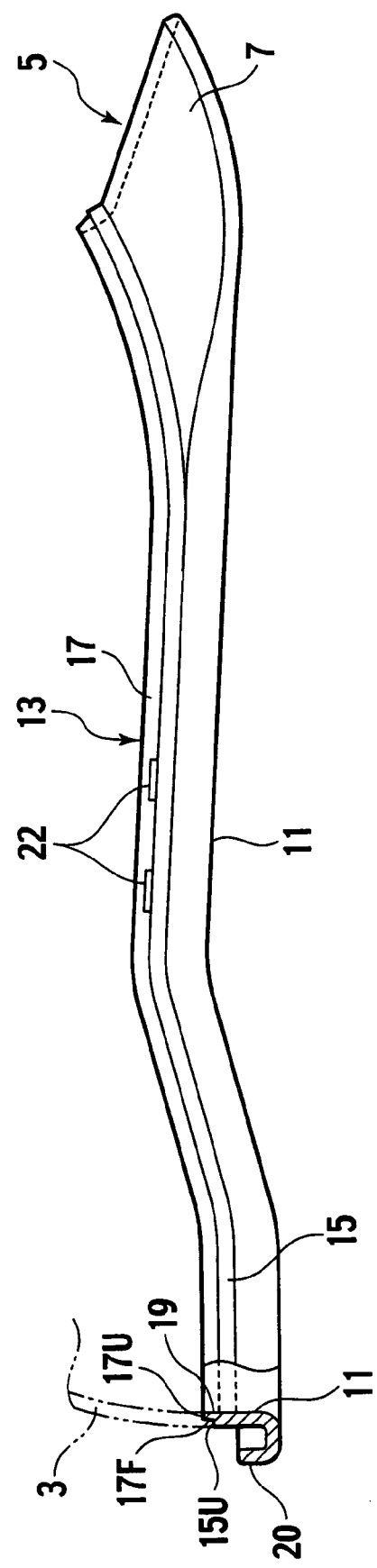
FIG. 3 is a partially broken explanatory diagram showing a configuration of the visor.
Figure 4:
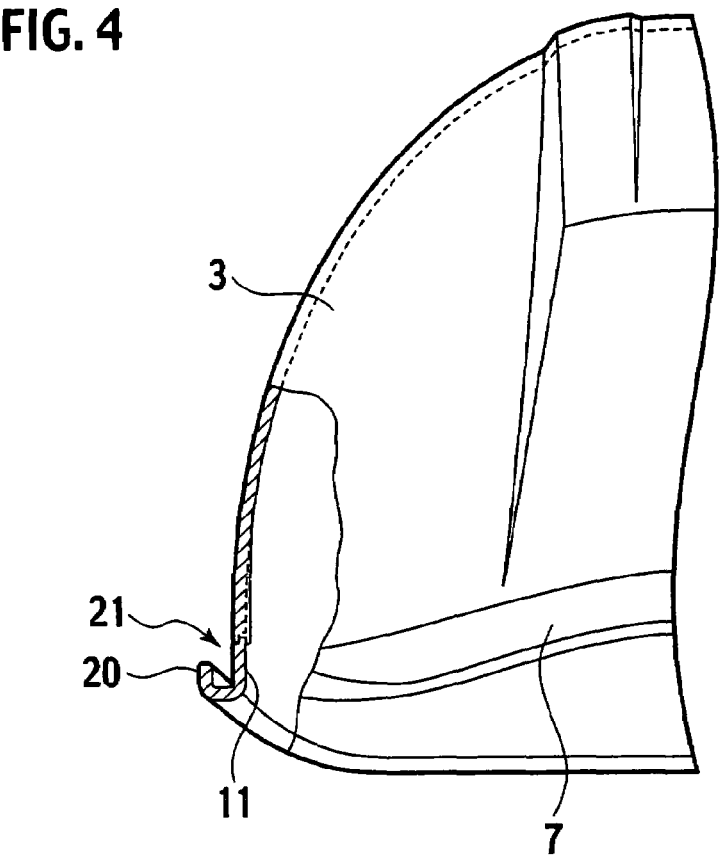
FIG. 4 is a partially broken front explanatory diagram showing a left half of a joined state of a cap body and the visor.

The joining portion 13 includes an annular wall 15 formed to project upward from the upper part of the annular portion 11. Inside the upper part of this annular wall 15, as shown in FIG. 3, an annular joining wall 17 thinner than the annular wall 15 is formed. An upper surface 15U of the annular wall 15, an upper surface 17U of the joining wall 17, and an annular outer peripheral surface 17F of the joining wall 17 constitute a joining surface 19 for joining the cap body 3 and the visor 5 together.

As the joining surface 19 includes the upper surface 15U of the annular wall 15, the upper surface 17U of the joining wall 17, and the outer peripheral surface 17F of an upper-lower direction between both upper surfaces 15U and 17U, its section is formed as a staged nearly Z-shaped three-dimensional joining surface.

Additionally, in a part of a rear side near both ends of the flange 7 in the annular portion 11 of the joining portion 13 of the visor 5, a reinforcement portion formed by folding an outer edge 20 of the annular portion 11 upward and having a U-shaped section is disposed. With this configuration, it is possible to reinforce the annular portion 11 and to suppress falling of water drops.

The integral joining of the cap body 3 and the visor 5 can use various joining methods such as a joining method using an adhesive, a joining method based on an ultrasonic heating welding method, and a method for inserting and setting the visor 5 in an injection mold for injection-molding the cap body 3, and integrally joining them when the cap body 3 is injection-molded.

Figure 5:
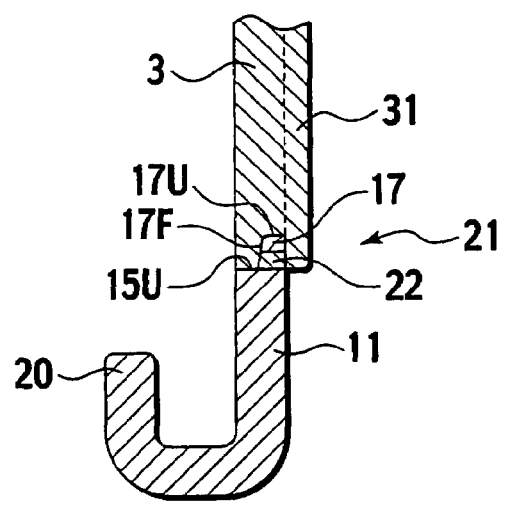
FIG. 5 is an expanded sectional explanatory diagram showing a part of a joining portion of the cap body and the visor.

In a plurality of places of front-rear and left-right sides of the cap body 3 which are joining areas of the cap body 3 and the visor 5, as shown in FIG. 5, a sandwiching portion 21 is formed to make a part of the cap body 3 thick and to sandwich the joining wall 17 of the joining portion 13 from the inside and the outside. Corresponding to this sandwiching portion 21, a through-hole 22 is formed through the joining wall 17 in an inner-outer direction. Accordingly, even when the helmet 1 tends to be deformed back and forth or left and right by an external force of a back and forth or left and right direction, joining of the cap body 3 and the visor 5 is held more firmly, preventing peeling-off.

In the above configuration, when the visor 5 is formed to be transparent or half-transparent, materials of the cap body 3 and the visor 5 are preferably different while the materials are allowed to be similar. In this case, by using a material of the visor 5 relatively more flexible than that of the cap body 3, it is possible to prevent concentration of stress in the joining areas of the cap body 3 and the visor 5 caused by the deformation of the visor 5 during application of an external force to the visor 5, thereby preventing peeling-off of the joining areas of the cap body 3 and the visor 5 from each other.

In other words, by using the material of the visor 5 relatively more flexible than that of the cap body 3, the visor 5 itself is provided with stress concentration prevention means for preventing stress concentration in the joining areas of the cap body 3 and the visor 5. As the visor 5 is relatively flexible, a function of absorbing shocks of the external force applied to the visor 5 is realized.

By forming the visor 5 to be transparent, nothing is present in parts lower than the joining areas of the cap body 3 and the visor 5 to block a view of a wearer of the helmet 1, and thus a view is widened. Even when the visor 5 is transparent, its rear side may be formed nontransparent as it has nothing to do with a view. Moreover, when the materials of the cap body 3 and the visor 5 are different, a color of the visor 5 can be set similar to that of the cap body 3 or employ various colors, and thus design selection is widened.

When the materials of the cap body 3 and the visor 5 are different, contrary to the above, the visor 5 can be configured by using a resin nearly equal or higher in hardness than that of the cap body 3. In this case, as described above, it is possible to increase the strength by folding the outer edge 20 of the annular portion 11 upward to form a section into a U shape. When an external force such as side pressure is applied to the outer edge 20, by deforming the outer edge 20 inside or outside, it is possible to prevent (suppress) stress concentration in the joining areas of the cap body 3 and the visor 5. In other words, stress can be dispersed. Similar effects are provided when the material of the visor 5 is relatively flexile as described above.

In other words, with this configuration, when an external force is applied to the outer edge 20, by deforming the other edge 20, it is possible to prevent (suppress) stress concentration in the joining areas of the cap body 3 and the visor 5, and the outer edge 20 constitutes a kind of stress concentration prevention means.

Figure 6:
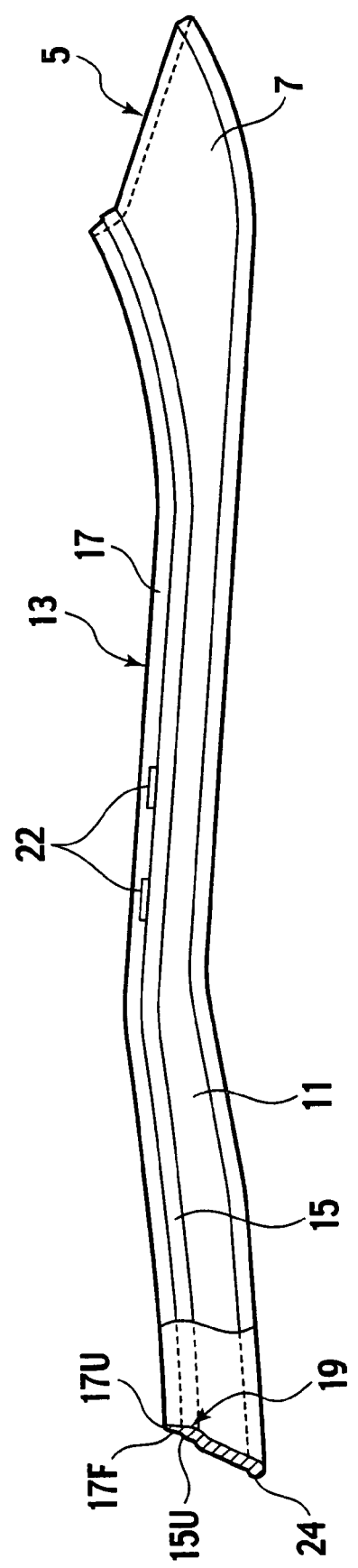
FIG. 6 is a partially broken explanatory diagram showing a configuration of a visor according to a second embodiment.

FIG. 6 shows a second embodiment of a visor 5. In the second embodiment, components having the same functions as those of the above components are denoted by similar reference numerals, and repeated explanation will be avoided.

According to the second embodiment, the visor 5 includes a projection 24 formed in an outer edge of an annular portion 11 into a proper sectional shape such as a circular, elliptic, triangular or trapezoidal shape. Thus, by forming the projection in the outer edge, it is possible to increase strength of the annular portion 11 thereby realizing effects similar to the above. Moreover, for example, it is possible to suppress deformation or the like when the visor is set in an injection mold for injection-molding a cap body 3, which is effective for integrally joining the visor 5 to the cap body 3 when the cap body 3 is injection-molded.

When the projection 24 is formed as described above, a mold configuration becomes simple as compared with the above case of forming the section into the U shape. Moreover, the amount of a used resin can be suppressed enabling inexpensive manufacturing.

Figure 7:
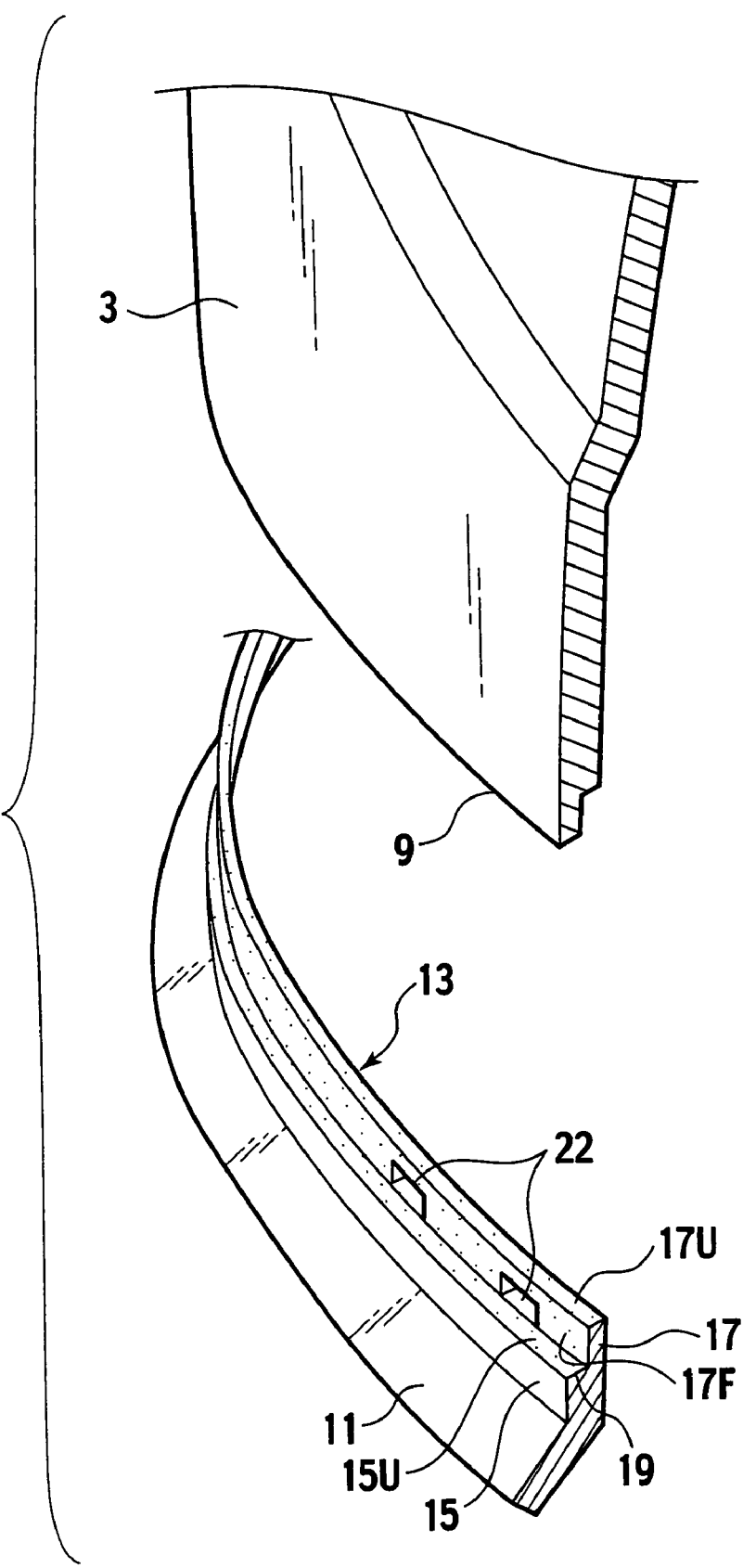
FIG. 7 is a perspective explanatory diagram of a joining portion of a cap body and the visor.

As described above, and as shown in detail in FIG. 7, the joining surface 19 includes an upper surface 15U of an annular wall 15, an upper surface 17U of a joining wall 17, and the outer peripheral surface 17F of an upper-lower direction between both upper surfaces 15U and 17U, and a section is formed as a staged and nearly Z-shaped three-dimensional joining surface. The joining surface 19 before joining to the cap body 3 is formed to be a rough surface having, e.g., a microprojection of about 10 to 40 μm. In a plurality of places of the joining wall 17, a through-hole 22 is formed through the joining wall 17 in an inner-outer direction (thickness direction).

Figure 10:
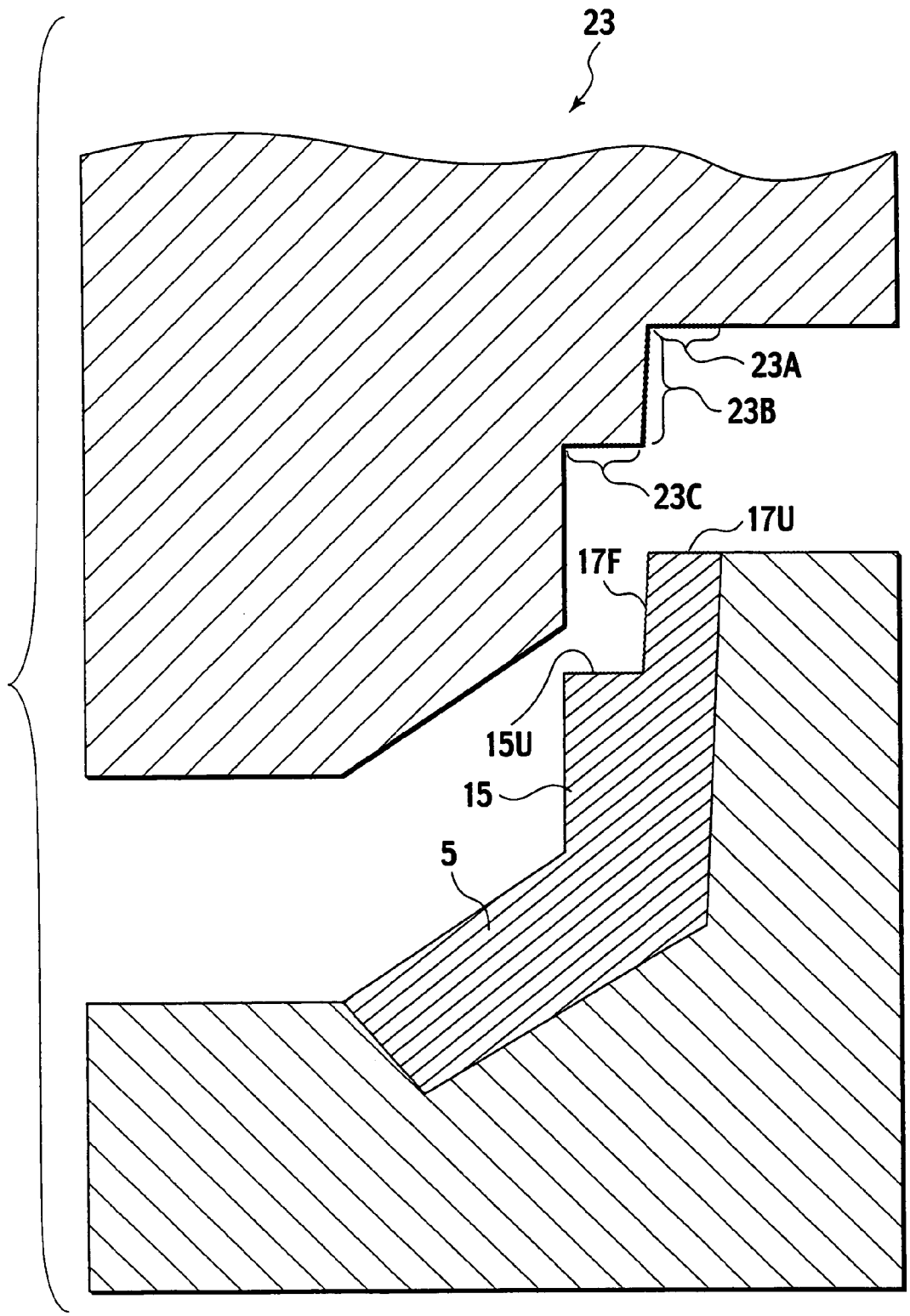
FIG. 10 is an explanatory diagram of a mold for forming a joining surface with the visor rough.

Incidentally, the joining surface 19 of the visor 5 is formed to be a rough surface by injection-molding the visor 5 in an injection mold 23 (refer to FIG. 10). In other words, joining surface forming surfaces 23A, 23B and 23C corresponding to the joining surface 19 of the injection mold 23 are formed to be rough surfaces having microasperity beforehand. For example, the joining surface forming surfaces 23A, 23B and 23C are subjected to crimp processing of applying an acidic solution to corrode the surfaces and forming microprojected/recessed designs.

Thus, by using the injection mold 23 to injection-mold the visor 5, a joining surface of an end surface of the visor 5 as a molded article is formed to be a rough surface having microasperity to which shapes of the joining surface forming surfaces 23A, 23B and 23C have been transferred.

To manufacture the helmet 1 by injection molding, as shown in FIG. 8, the thin visor 5 preliminarily injection-molded by using the injection mold 23 is inserted and set in a lower mold 25A of an injection mold 25 of a cap body 1. Subsequently, upper molds 25B and 25C are set to expose the joining surface 19 of the visor 5 in a cavity 27. Then, when a resin 29 of a proper material is injected into the cavity 27 for injection-molding the cap body 3, as shown in FIG. 8C, flowing front end of the resin 29 in the cavity 27 comes into contact with the joining surface 19 of the visor 5. Then, pressure is temporarily applied to high injection pressure, and pressure is subsequently lowered to proper pressure keeping.

In this case, as the joining surface 19 of the visor 5 is formed to be a rough surface having microasperity beforehand, the microprojection of a small heat capacity is fused by contact with the resin 29 to be integrally joined to the resin 29 constituting the cap body 3. In other words, during injection-molding of the cap body 3, the visor 5 as the insert is fused to be joined to the cap body 3. Accordingly, the cap body 3 as the injection-molded article and the visor 5 as the insert are firmly joined together.

Figure 9:
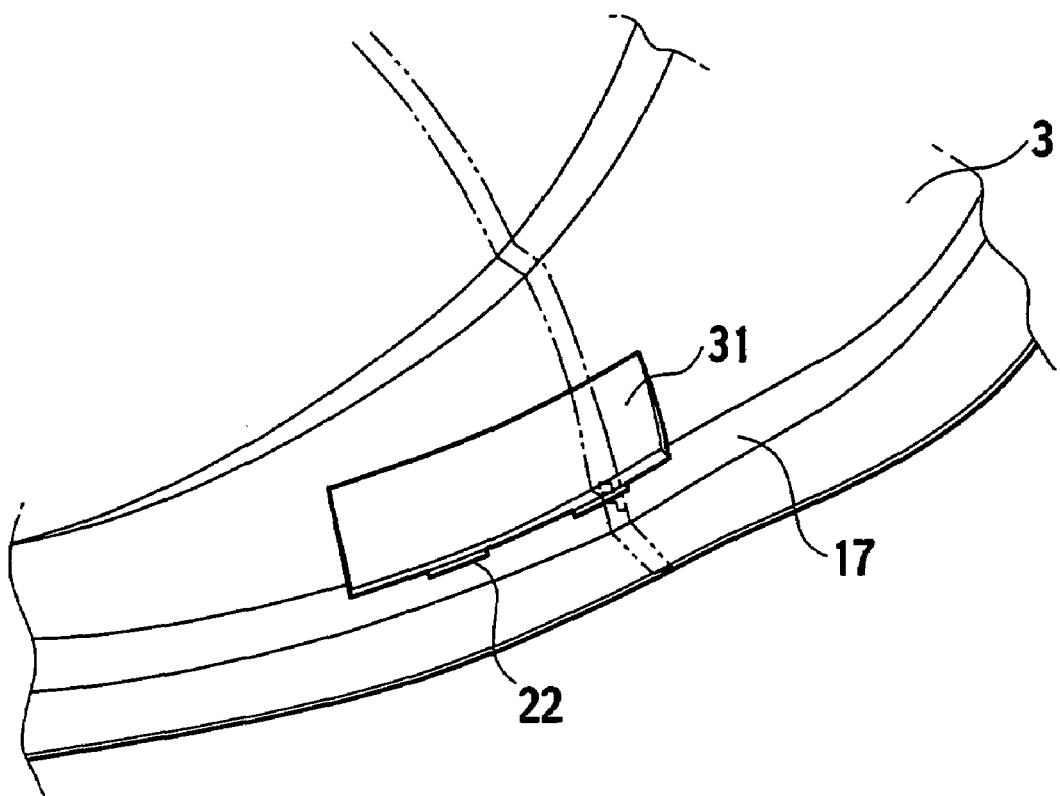
FIG. 9 is an explanatory diagram of a tongue-shaped part formed inside the cap body.

A part of a resin constituting the cap body 3 is brought into contact with the joining surface 19 of the visor 5 to be pressed, whereby it is intruded into the through-hole 22 formed in the joining wall 17 to mechanically join the cap body 3 and the visor 5 together. In this case, preferably, as shown in FIG. 9, a tongue-shaped part 31 extending to the inside of the joining wall 17 is formed inside the cap body 3, and an instructed engagement part intruded from the tongue-shaped part 31 (FIG. 5) into the through-hole 22 is formed. With this configuration, a part of the joining wall 17 is sandwiched from the inside by the tongue-shaped part 31, and mechanically jointed by the intruded engagement part to increase joining strength.

As shown in FIG. 5, a tongue-shaped part 31 is formed, and thus a part in which the tongue-shaped part 13 is formed becomes thick.

As can be understood from the foregoing, the microprojection of the rough surface of the joining surface 19 of the visor 5 as the insert is fused to be joined to the cap body 3 as the injection-molded article, a part of the resin constituting the cap body 3 becomes a tongue-shaped part 31 to sandwich the joining wall 13 from the inside, and a part of the tongue-shaped part 31 intrudes the through-hole 22 of the joining wall 17 to realize mechanical joining. Thus, the joining of the cap body 3 and the visor 5 becomes strong as equal as that when the cap body 3 and the visor 5 are integrally injection-molded from the beginning, peeling-off of the visor 5 from the cap body 3 is prevented even when deformation or the like occurs in the joining areas.

The joining surface of the visor 5 is formed into the annular shape corresponding to the edge of the cap body 3, and formed as the three-dimensional joining surface. Thus, even when the cap body 3 as the injection-molded article and the visor 5 as the insert are both thin, and the joining portions thereof are both thin, it is possible to increase a joining area thereby enhancing joining strength between the cap body 3 and the visor 5.

The invention claimed is:

1. A helmet comprising:
a visor extending outward from a cap body, the visor preliminarily injection-molded and integrally joined to the cap body;
a joining wall formed in the visor and stage-shaped in section to have a nearly Z-shaped three-dimensional joining surface, the joining wall being joined to an inner side of an opening edge formed in the cap body;
a tongue-shaped part formed inside the cap body forming a thick part of the cap body and extending to an inner side of the joining wall;
a sandwiching portion sandwiching a part of the joining wall together with the tongue-shaped part; and
an intruding engagement part formed of resin and constituting a portion of the cap body, the intruding engagement part intruding into a through-hole formed in the joining wall from the tongue-shaped part.

2. The helmet according to claim 1, wherein a joining portion of the visor and the cap body is formed in annular shapes, and the sandwiching portion and the intruding engagement part are formed at front-rear and left-right sides of the cap body.

3. The helmet according to claim 1, wherein joining surfaces of the visor and the cap body are fused to be joined together.

4. The helmet according to claim 1, wherein the visor includes stress concentration prevention means for preventing stress concentration in the joining portion of the cap body and the visor.

5. The helmet according to claim 1, wherein materials of the cap body and the visor are different from each other.

6. The helmet according to claim 1, wherein a reinforcement portion is formed in an outer peripheral edge of at least a rear area of the visor.

7. The helmet according to claim 6, wherein a section of the reinforcement portion is U-shaped.

8. The helmet according to claim 1, wherein the joining portion of the visor and the cap body is built by forming the joining surface of the joining wall formed in the visor to be a rough surface having a microprojection of a small heat capacity fused by contact with the resin of the cap body, and fusing and joining the rough surface.

* * * * *